(12) United States Patent
Servino

(10) Patent No.: US 10,334,132 B2
(45) Date of Patent: Jun. 25, 2019

(54) IMAGE READING DEVICE FOR ROTATING READ IMAGE IN ACCORDANCE WITH ORIENTATION OF FACE IMAGE, IMAGE FORMING APPARATUS, AND IMAGE READING METHOD

(71) Applicant: KYOCERA Document Solutions Inc., Osaka-shi, Osaka (JP)

(72) Inventor: Arvin Gil Servino, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/793,807

(22) Filed: Oct. 25, 2017

(65) Prior Publication Data
US 2018/0139344 A1 May 17, 2018

(30) Foreign Application Priority Data
Nov. 15, 2016 (JP) ................................. 2016-222088

(51) Int. Cl.
*H04N 1/00* (2006.01)
*H04N 1/387* (2006.01)
*H04N 1/028* (2006.01)

(52) U.S. Cl.
CPC ......... *H04N 1/028* (2013.01); *H04N 1/00721* (2013.01); *H04N 1/00809* (2013.01); *H04N 1/3877* (2013.01)

(58) Field of Classification Search
CPC ............. G06K 9/6247; G06K 9/00275; G06K 9/00308; G06K 9/4642; G06K 9/6214; G06T 3/4053; G06T 7/73; A63F 13/04; A63F 13/08; A63F 13/213; A63F 13/219; A63F 13/245; A63F 13/5255; A63F 13/812; A63F 13/837; A63F 2300/1012; A63F 2300/1062; A63F 2300/1087;
(Continued)

(56) References Cited

U.S. PATENT DOCUMENTS 5,077,406 A * 12/1991 Tanaka ................. C07D 217/16
546/114
5,077,811 A * 12/1991 Onda .................... G06K 9/3208
382/290
(Continued)

FOREIGN PATENT DOCUMENTS

JP 04242106 A 8/1992

*Primary Examiner* — Negussie Worku
(74) *Attorney, Agent, or Firm* — Alleman Hall Creasman & Tuttle LLP

(57) ABSTRACT

An image reading device includes an image reading portion, a detection processing portion, a determination processing portion, and a rotation processing portion. The image reading portion is configured to read an image of a document. The detection processing portion is configured to detect a face image included in a read image read by the image reading portion. The determination processing portion is configured to determine an orientation of the face image when the face image is detected by the detection processing portion. The rotation processing portion is configured to rotate the read image so as to cause the orientation of the face image determined by the determination processing portion to coincide with a predetermined specific direction when the orientation of the face image does not coincide with the specific direction.

9 Claims, 4 Drawing Sheets

(58) Field of Classification Search
CPC .......... A63F 2300/66; A63F 2300/8011; A63F 2300/8076; H04N 1/00721; H04N 1/00809; H04N 1/028; H04N 1/3877
See application file for complete search history.

(56) References Cited

U.S. PATENT DOCUMENTS

| | | | | |
|---|---|---|---|---|
| 5,815,280 | A * | 9/1998 | Ohmura | H04N 1/00915 |
| | | | | 358/296 |
| 6,633,406 | B1 * | 10/2003 | Imaizumi | H04N 1/00681 |
| | | | | 358/1.12 |
| 2003/0049062 | A1 * | 3/2003 | Machida | H04N 1/3877 |
| | | | | 399/371 |
| 2005/0074170 | A1 * | 4/2005 | Debrito | G06T 1/00 |
| | | | | 382/232 |
| 2007/0104374 | A1 * | 5/2007 | Terakawa | G06K 9/00248 |
| | | | | 382/190 |
| 2007/0258658 | A1 * | 11/2007 | Kobayashi | G06T 15/20 |
| | | | | 382/276 |
| 2008/0253664 | A1 * | 10/2008 | Li | G06K 9/00228 |
| | | | | 382/226 |
| 2012/0294533 | A1 * | 11/2012 | Ikenoue | H04N 1/3877 |
| | | | | 382/195 |
| 2013/0201219 | A1 * | 8/2013 | Zhao | G06F 3/012 |
| | | | | 345/649 |
| 2015/0117912 | A1 * | 4/2015 | Kamiyama | G03G 15/0131 |
| | | | | 399/301 |

\* cited by examiner

IMAGE READING DEVICE FOR ROTATING READ IMAGE IN ACCORDANCE WITH ORIENTATION OF FACE IMAGE, IMAGE FORMING APPARATUS, AND IMAGE READING METHOD

INCORPORATION BY REFERENCE

This application is based upon and claims the benefit of priority from the corresponding Japanese Patent Application No. 2016-222088 filed on Nov. 15, 2016, the entire contents of which are incorporated herein by reference.

BACKGROUND

The present disclosure relates to an image reading device for reading image data from a document, an image forming apparatus including the image reading device, and an image reading method.

In an image reading device such as a scanner, an image is read from a document conveyed by a document conveying portion such as an automatic document feeder (ADF). For example, in the image reading device, an image is read from a document such as a photograph or a document including a face image. Conventionally, a device capable of recognizing a face image included in acquired image data is known.

SUMMARY

An image reading device according to one aspect of the present disclosure includes an image reading portion, a detection processing portion, a determination processing portion, and a rotation processing portion. The image reading portion is configured to read an image of a document. The detection processing portion is configured to detect a face image included in a read image read by the image reading portion. The determination processing portion is configured to determine an orientation of the face image when the face image is detected by the detection processing portion. The rotation processing portion is configured to rotate the read image so as to cause the orientation of the face image determined by the determination processing portion to coincide with a predetermined specific direction when the orientation of the face image does not coincide with the specific direction.

An image forming apparatus according to another aspect of the present disclosure includes the image reading device and an image forming portion. The image forming portion is configured to form an image on the basis of image data.

An image reading method according to another aspect of the present disclosure includes a reading step, a detection step, a determination step, and a rotation step. The reading step is a step of reading an image of a document. The detection step is a step of detecting a face image included in a read image read in the reading step. The determination step is a step of determining an orientation of the face image when the face image is detected in the detection step. The rotation step is a step of rotating the read image so as to cause the orientation of the face image determined in the determination step to coincide with a predetermined specific direction when the orientation of the face image does not coincide with the specific direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. It should be noted that the following embodiment is an example embodying the present disclosure and does not limit the technical scope of the present disclosure.

Schematic Configuration of Image Forming Apparatus 10

First, a schematic configuration of an image forming apparatus 10 according to the embodiment of the present disclosure will be described with reference to FIGS. 1 and 2. Here, FIG. 1 is a cross-sectional schematic diagram showing the configuration of the image forming apparatus 10.

The image forming apparatus 10 is a multifunction peripheral having a plurality of functions such as a facsimile function and a copy function, as well as a scanning function to read image data from a document and a printing function to form an image on the basis of image data.

Figure 1:
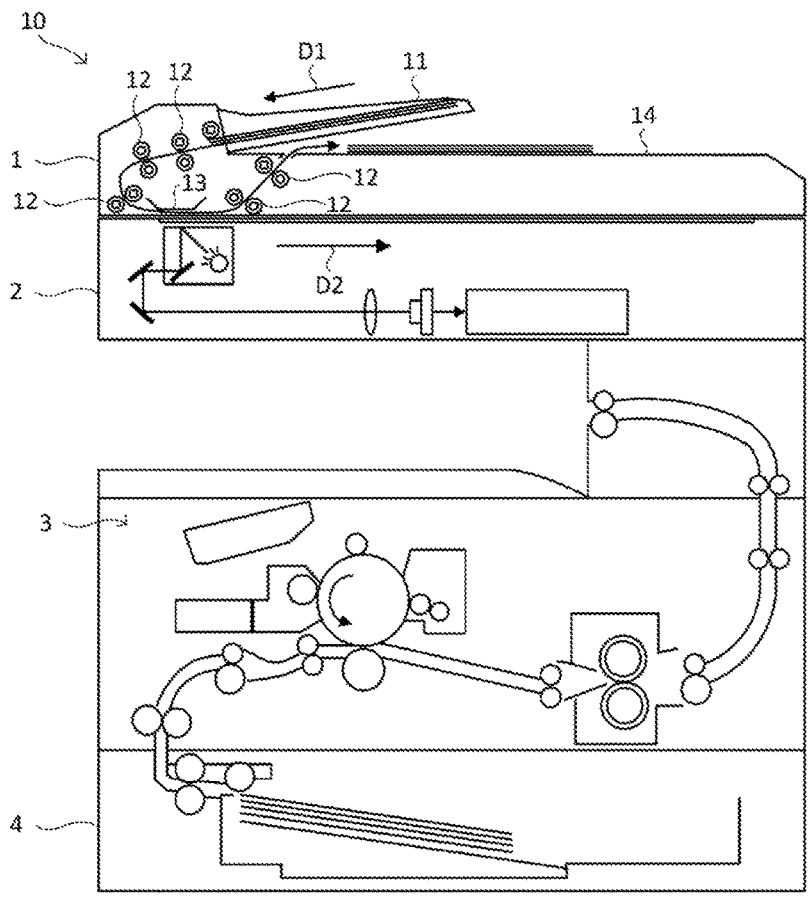
FIG. 1 is a diagram showing the configuration of an image forming apparatus according to an embodiment of the present disclosure.
Figure 2:
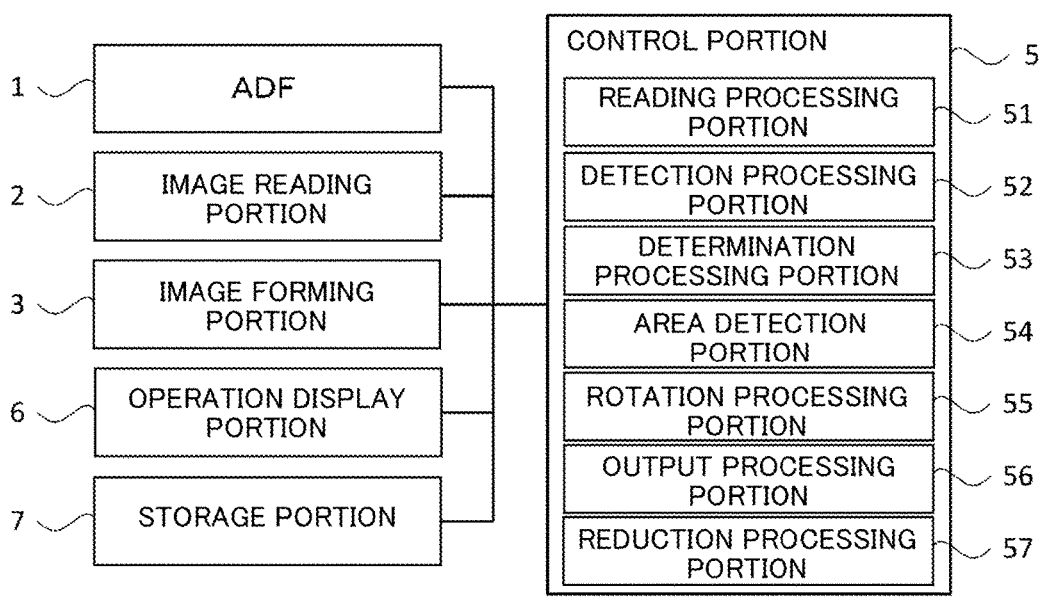
FIG. 2 is a block diagram showing the system configuration of the image forming apparatus according to the embodiment of the present disclosure.

As shown in FIGS. 1 and 2, the image forming apparatus 10 includes an automatic document feeder (ADF) 1, an image reading portion 2, an image forming portion 3, a sheet feed portion 4, a control portion 5, an operation display portion 6, and a storage portion 7. Here, a device that includes the image reading portion 2 and the control portion 5 is an example of an image reading device in the present disclosure. The present disclosure is applicable to an image reading device or an image forming apparatus such as a scanner apparatus, a facsimile apparatus, and a copy machine.

As shown in FIG. 1, the ADF 1 includes a document placement portion 11, a plurality of conveying rollers 12, a document holder 13, and a sheet discharge portion 14. The ADF 1 sequentially conveys, one by one, documents placed on the document placement portion 11, along a conveyance direction D1 shown in FIG. 1. Here, the ADF 1 is an example of a document conveying portion in the present disclosure. The image reading portion 2 includes a document table, a light source, a plurality of mirrors, an optical lens, and a CCD. The image reading portion 2 reads an image of a document placed on the document table or an image of each document conveyed by the ADF 1.

The image forming portion 3 is capable of forming an image by electrophotography on the basis of image data read by the image reading portion 2. In addition, the image forming portion 3 is also capable of forming an image on the basis of image data inputted from an information processing apparatus such as an external personal computer. Specifically, the image forming portion 3 includes a photosensitive drum, a charging device, a laser scanning unit, a developing device, a transfer device, a cleaning device, a fixing device, and a sheet discharge tray. The sheet feed portion 4 includes a sheet feed cassette, a sheet conveyance path, and a plurality of conveying rollers, and feeds sheets to the image forming portion 3. The image forming portion 3 forms an image based on image data on a sheet fed from the sheet feed portion 4. The sheet having the image formed thereon by the image forming portion 3 is discharged to the sheet discharge tray. The image forming portion 3 may form an image by another image forming method such as an inkjet method.

The control portion 5 includes control devices such as a CPU, a ROM, a RAM, and an EEPROM that are not shown. The CPU is a processor that executes various calculation processes. The ROM is a non-volatile storage medium in which information such as a control program for causing the CPU to execute various processes is stored in advance. The RAM is a volatile medium, and the EEPROM is a non-volatile medium. The RAM and the EEPROM are used as temporary storage memories (working areas) for various processes executed by the CPU. At the control portion 5, various control programs stored in advance in the ROM are executed by the CPU. Accordingly, overall control of the image forming apparatus 10 is performed by the control portion 5. The control portion 5 may be composed of an electronic circuit such as an integrated circuit (ASIC) or may be a control portion provided independently of a main control portion that performs overall control of the image forming apparatus 10.

The operation display portion 6 includes: a display portion, such as a liquid crystal display, which displays various kinds of information in accordance with control instructions from the control portion 5; and an operation portion, such as an operation key or a touch panel, which inputs various kinds of information to the control portion 5 in accordance with operations of a user.

The storage portion 7 is a non-volatile storage medium. For example, the storage portion 7 is a storage medium such as a flash memory, a solid-state drive (SSD) or a hard disk drive (HDD).

Meanwhile, in the image forming apparatus 10, the orientation of a face image included in a document conveyed by the ADF 1 and the conveyance direction D1 (see FIG. 3) by the ADF 1 do not coincide with each other in some cases. In such a case, in image data read by the image reading portion 2, the orientation of the face image included in the image data is a lateral orientation or a downward orientation. Here, when a user desires image data including the face image having an upward orientation, time and effort is taken by the user to perform a rotation operation of rotating the image data by 90 degrees or 180 degrees.

On the other hand, the image forming apparatus 10 according to the embodiment of the present disclosure is capable of saving time and effort to be taken by the user when an image is read from the document including the face image.

Specifically, a face image reading program for causing the CPU to execute a later-described face image reading process (see a flowchart of FIG. 4) is stored in advance in the ROM of the control portion 5. The face image reading program may be stored in a non-transitory computer-readable storage medium such as a CD, a DVD, or a flash memory, and may be read from the storage medium and installed into the storage portion 7.

As shown in FIG. 2, the control portion 5 includes a reading processing portion 51, a detection processing portion 52, a determination processing portion 53, an area detection portion 54, a rotation processing portion 55, an output processing portion 56, and a reduction processing portion 57. Specifically, the control portion 5 executes the face image reading program stored in the ROM, by using the CPU. Accordingly, the control portion 5 functions as the reading processing portion 51, the detection processing portion 52, the determination processing portion 53, the area detection portion 54, the rotation processing portion 55, the output processing portion 56, and the reduction processing portion 57.

The reading processing portion 51 reads an image of each document conveyed by the ADF 1, by using the ADF 1 and the image reading portion 2. The reading processing portion 51 may read an image of a document placed on the document table, by using the image reading portion 2.

The detection processing portion 52 detects a face image included in a read image read by the reading processing portion 51.

For example, the detection processing portion 52 executes a contour detection process of detecting the contour of an image included in the read image, on the read image. Next, the detection processing portion 52 extracts an image that is included in the read image and has an elliptical contour, on the basis of a result of the contour detection process. Then, the detection processing portion 52 determines whether the extracted image having the elliptical contour is the face image, by using a pattern matching image that is stored in the storage portion 7 in advance and used for recognizing the face image. A method for detecting the face image by the detection processing portion 52 is not limited to the above method, and a conventionally known method may be used.

When the face image is detected by the detection processing portion 52, the determination processing portion 53 determines the orientation of the face image. For example, the orientation of the face image is a direction from a chin portion toward a glabella portion in the face image.

Here, a method for determining the orientation of the face image by the determination processing portion 53 will be described with reference to FIG. 3. A read image G10 shown in FIG. 3 includes face images G11 to G14.

For example, the determination processing portion 53 identifies a chin portion G11A and a glabella portion G11B included in the face image G11, when determining the orientation of the face image G11. For example, the determination processing portion 53 identifies the chin portion G11A and the glabella portion G11B on the basis of the positions of a chin and eyes included in the pattern matching image when the face image G11 matches with the pattern matching image. Next, the determination processing portion 53 identifies a direction D3 (see FIG. 3) from the chin portion G11A toward the glabella portion G11B. Then, the determination processing portion 53 determines that the identified direction D3 is the orientation of the face image G11.

Similarly, the determination processing portion 53 identifies a chin portion G12A and a glabella portion G12B included in the face image G12, and determines that a direction D4 (see FIG. 3) from the chin portion G12A toward the glabella portion G12B is the orientation of the face image G12. In addition, the determination processing portion 53 identifies a chin portion G13A and a glabella portion G13B included in the face image G13, and determines that a direction D5 (see FIG. 3) from the chin portion G13A toward the glabella portion G13B is the orientation of the face image G13. Moreover, the determination processing portion 53 identifies a chin portion G14A and a glabella portion G14B included in the face image G14, and determines that a direction D6 (see FIG. 3) from the chin portion G14A toward the glabella portion G14B is the orientation of the face image G14.

When the face image is detected by the detection processing portion 52, the area detection portion 54 detects a character area included in the read image and the orientation of characters included in the character area.

For example, the area detection portion 54 detects the character area included in the read image, on the basis of an execution result of the contour detection process executed by the detection processing portion 52. In addition, when the character area is detected, the area detection portion 54 performs an optical character recognition (OCR) process of recognizing the characters included in a partial region or the entirety of the character area. Then, the area detection portion 54 detects the orientation of the characters included in the character area, on the basis of an execution result of the OCR process. Here, the orientation of the characters is a direction from a lower portion toward an upper portion in the character.

When the orientation of the face image determined by the determination processing portion 53 does not coincide with the conveyance direction D1, the rotation processing portion 55 rotates the read image so as to cause the orientation of the face image to coincide with the conveyance direction D1. Here, the conveyance direction D1 is an example of a predetermined specific direction in the present disclosure. The specific direction in the present disclosure may be a direction opposite to the conveyance direction D1. In addition, when the reading processing portion 51 reads an image of a document placed on the document table by using the image reading portion 2, the specific direction in the present disclosure may be a direction that is the same as or opposite to a reading direction D2 (see FIG. 1) in which reading is performed by the image reading portion 2 on the document placed on the document table.

Here, when the read image includes a plurality of the face images and does not include a group consisting of a plurality of the face images having similar orientations to each other, and the orientation of a first face image that is the largest among the plurality of the face images does not coincide with the conveyance direction D1, the rotation processing portion 55 rotates the read image so as to cause the orientation of the first face image to coincide with the conveyance direction D1.

When the read image includes the group and the orientation of the face images belonging to a specific group including the largest number of the face images does not coincide with the conveyance direction D1, the rotation processing portion 55 rotates the read image so as to cause the orientation of the face images belonging to the specific group to coincide with the conveyance direction D1. In addition, when a plurality of the specific groups are present and the orientation of the face images belonging to the specific group having the largest total value of the areas of the face images among the plurality of the specific groups does not coincide with the conveyance direction D1, the rotation processing portion 55 rotates the read image so as to cause the orientation of the face images belonging to the specific group having the largest total value of the areas of the face images to coincide with the conveyance direction D1.

When the read image does not include the character area, when the orientation of the characters included in the character area does not coincide with the conveyance direction D1, or when the proportion of the character area in the read image is less than a predetermined threshold, the rotation processing portion 55 rotates the read image so as to cause the orientation of the face image to coincide with the conveyance direction D1. For example, the threshold is 50 percent. The threshold may be arbitrarily changed in accordance with a user operation on the operation display portion 6.

Specifically, when the angle formed between the orientation of the face image and the conveyance direction D1 is not less than 0 degree and not greater than 45 degrees, the rotation processing portion 55 determines that the orientation of the face image coincides with the conveyance direction D1. On the other hand, when the angle formed between the orientation of the face image and the conveyance direction D1 exceeds 45 degrees and is not greater than 180 degrees, the rotation processing portion 55 determines that the orientation of the face image does not coincide with the conveyance direction D1. In addition, when the angle formed between the orientation of the characters included in the character area and the conveyance direction D1 is not greater than a predetermined reference angle, the rotation processing portion 55 determines that the orientation of the characters included in the character area coincides with the conveyance direction D1. For example, the reference angle is 5 degrees. The reference angle may be arbitrarily changed in accordance with a user operation on the operation display portion 6.

When the angle exceeds 45 degrees and is not greater than 135 degrees, the rotation processing portion 55 rotates the read image by 90 degrees in a direction in which the angle is decreased. In addition, when the angle exceeds 135 degrees and is not greater than 180 degrees, the rotation processing portion 55 rotates the read image by 180 degrees.

Figure 3:
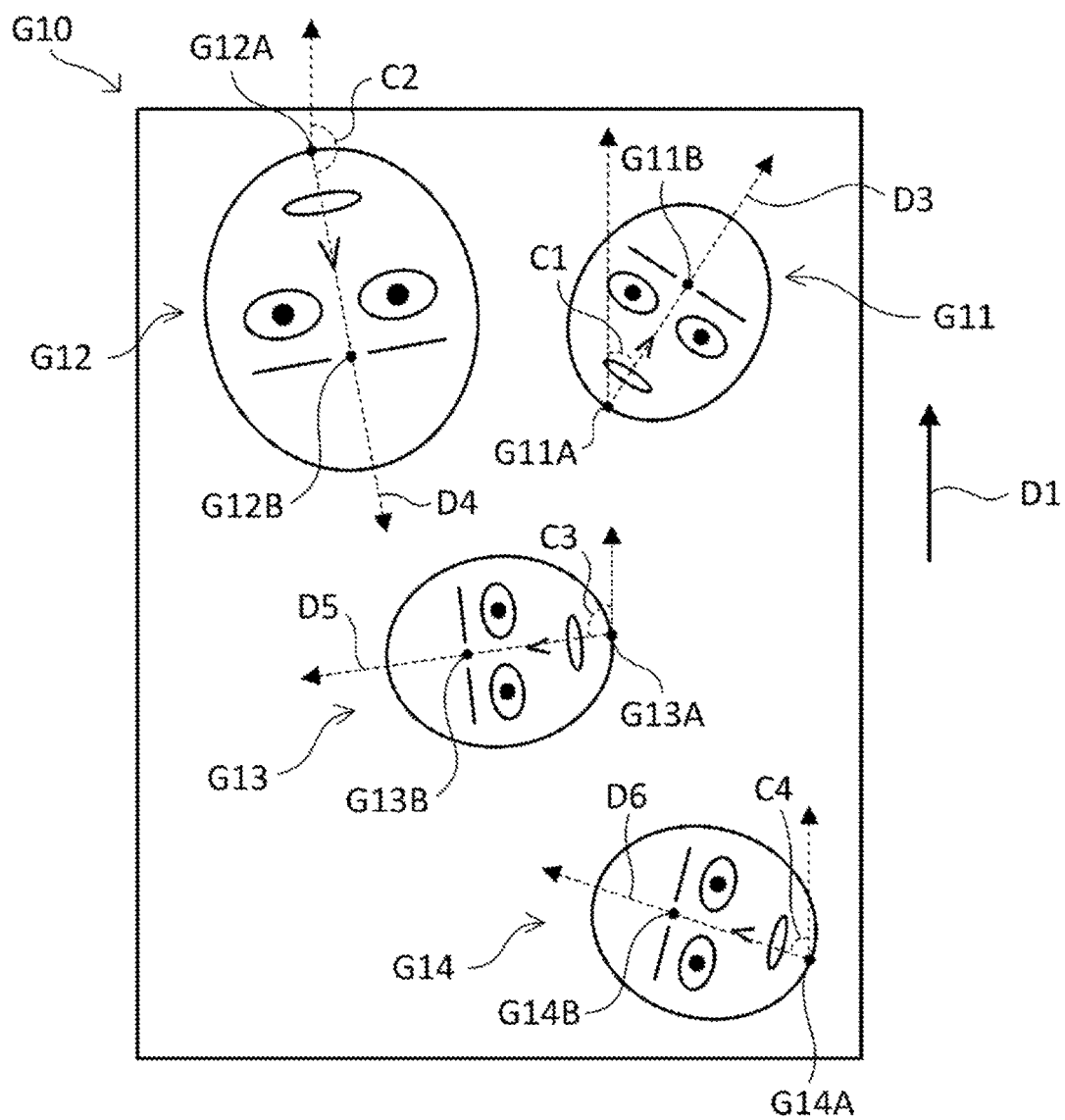
FIG. 3 is a diagram showing an example of a read image read by the image forming apparatus according to the embodiment of the present disclosure.

For example, it is assumed that the read image G10 shown in FIG. 3 does not include the face images G12 to G14 and includes only the face image G11. Here, an angle C1 formed between the orientation D3 of the face image G11 and the conveyance direction D1 shown in FIG. 3 is not less than 0 degree and not greater than 45 degrees. Thus, the rotation processing portion 55 determines that the orientation D3 of the face image G11 coincides with the conveyance direction D1, and does not rotate the read image G10.

It is also assumed that the read image G10 shown in FIG. 3 does not include the face images G11, G13, and G14 and includes only the face image G12. Here, an angle C2 formed between the orientation D4 of the face image G12 and the conveyance direction D1 shown in FIG. 3 exceeds 135 degrees and is not greater than 180 degrees. Thus, the rotation processing portion 55 rotates the read image G10 by 180 degrees.

It is also assumed that the read image G10 shown in FIG. 3 does not include the face images G11, G12, and G14 and includes only the face image G13. Here, an angle C3 formed between the orientation D5 of the face image G13 and the conveyance direction D1 shown in FIG. 3 exceeds 45 degrees and is not greater than 135 degrees. Thus, the rotation processing portion 55 rotates the read image G10 by 90 degrees in the clockwise direction.

It is also assumed that the read image G10 shown in FIG. 3 does not include the face images G11 to G13 and include only the face image G14. Here, an angle C4 formed between the orientation D6 of the face image G14 and the conveyance direction D1 shown in FIG. 3 exceeds 45 degrees and is not greater than 135 degrees. Thus, the rotation processing portion 55 rotates the read image G10 by 90 degrees in the clockwise direction.

When the angle formed between the orientation of the face image and the conveyance direction D1 is not greater than the reference angle, the rotation processing portion 55 may determine that the orientation of the face image coincides with the conveyance direction D1. In this case, the rotation processing portion 55 rotates the face image such that the angle formed between the orientation of the face image and the conveyance direction D1 by the ADF 1 is not greater than the reference angle.

When the read image includes a plurality of the face images and the orientations of any one or more of the face images coincide with the conveyance direction D1, the rotation processing portion 55 may not rotate the read image. In addition, regardless of presence/absence of the group, when the orientation of the first face image does not coincide with the conveyance direction D1, the rotation processing portion 55 may rotate the read image so as to cause the orientation of the first face image to coincide with the conveyance direction D1.

When the read image includes a plurality of the face images and does not include the group, and the orientation of a second face image that is closest from the center of the read image among the plurality of the face images does not coincide with the conveyance direction D1, the rotation processing portion 55 may rotate the read image so as to cause the orientation of the second face image to coincide with the conveyance direction D1. In addition, regardless of presence/absence of the group, when the orientation of the second face image does not coincide with the conveyance direction D1, the rotation processing portion 55 may rotate the read image so as to cause the orientation of the second face image to coincide with the conveyance direction D1.

When the read image does not include the character area, or when the orientation of the characters included in the character area does not coincide with the conveyance direction D1, the rotation processing portion 55 may rotate the read image so as to cause the orientation of the face image to coincide with the conveyance direction D1.

The output processing portion 56 outputs each read image read by the reading processing portion 51. Specifically, the output processing portion 56 prints each read image by using the image forming portion 3. Here, the output processing portion 56 is an example of a print processing portion in the present disclosure.

The output processing portion 56 may store each read image in the storage portion 7. In addition, the output processing portion 56 may create a document file such as a PDF file in which each read image is aligned in order of reading by the reading processing portion 51, and may store the created document file in the storage portion 7. Moreover, the output processing portion 56 may transmit each read image or the document file to an external information processing apparatus connected thereto via a network such as a local area network (LAN).

When the read image is rotated by the rotation processing portion 55 in the clockwise direction or in the counterclockwise direction by 90 degrees, the reduction processing portion 57 reduces the rotated read image to a size in which the read image fits on a sheet to be used for printing by the output processing portion 56.

The control portion 5 may not include some or all of the area detection portion 54, the output processing portion 56, and the reduction processing portion 57.

Face Image Reading Process

Figure 4:
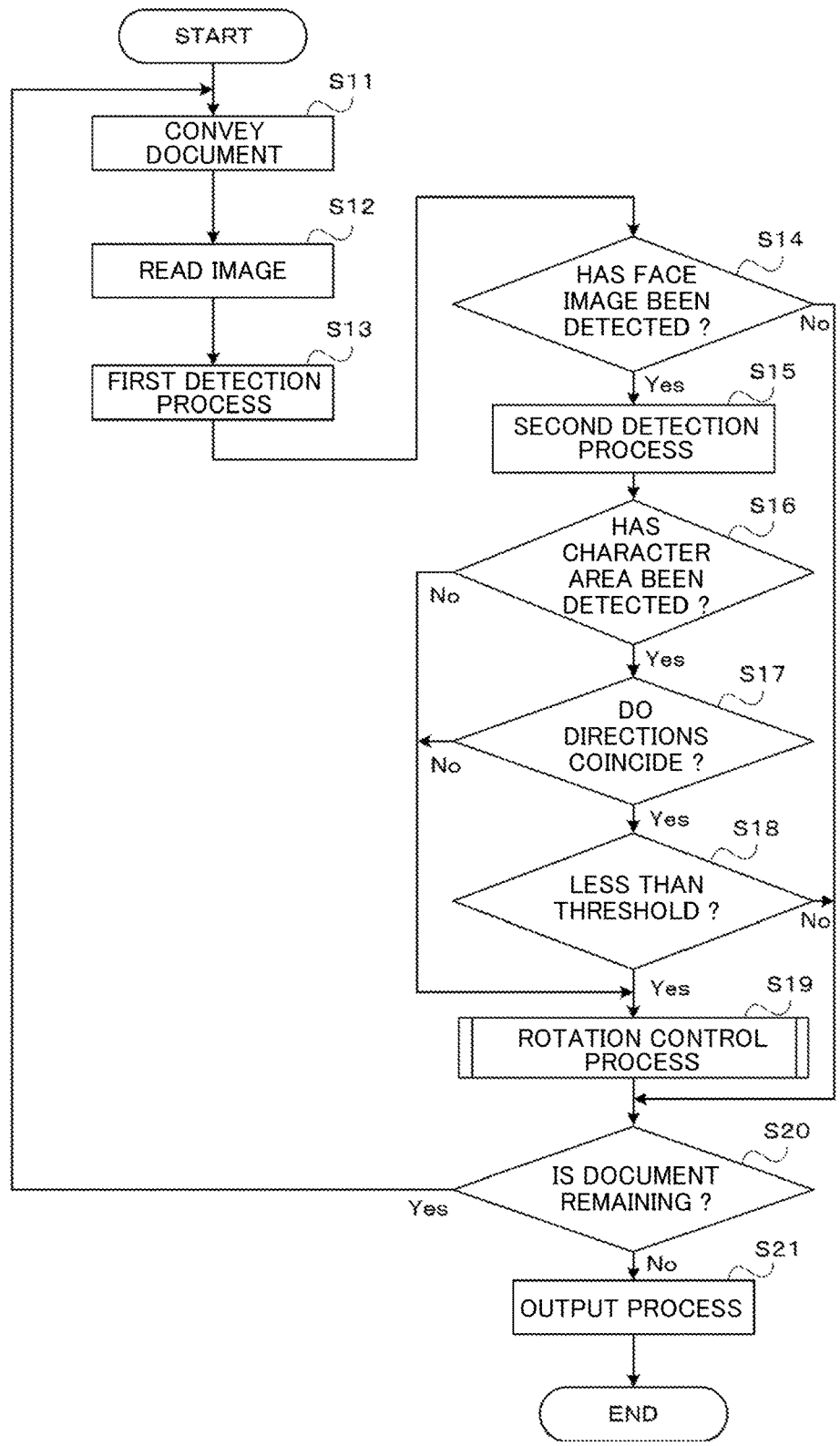
FIG. 4 is a flowchart showing an example of a face image reading process executed in the image forming apparatus according to the embodiment of the present disclosure.

Hereinafter, the image reading method of the present disclosure will be described with reference to FIG. 4 together with an example of the procedure of the face image reading process executed by the control portion 5 in the image forming apparatus 10. Here, S11, S12 . . . represent numbers of process procedures (steps) executed by the control portion 5. The control portion 5 executes the face image reading process when execution of the face image reading process is instructed by a user operation on the operation display portion 6.

Step S11

First, in step S11, the control portion 5 conveys a document placed on the document placement portion 11, to the sheet discharge portion 14 by using the ADF 1.

Step S12

In step S12, the control portion 5 reads an image of the document conveyed in step S11, by using the image reading portion 2. Here, the processes in steps S11 and S12 are an example of a reading step in the present disclosure and are executed by the reading processing portion 51 of the control portion 5.

Step S13

In step S13, the control portion 5 executes a first detection process of detecting the face image included in the read image read in step S12. Here, the process in step S13 is an example of a detection step in the present disclosure and is executed by the detection processing portion 52 of the control portion 5.

Step S14

In step S14, the control portion 5 determines whether the face image has been detected in the first detection process executed in step S13.

Here, when the control portion 5 determines that the face image has been detected (Yes in S14), the control portion 5 shifts the process to step S15. When the face image has not been detected (No in S14), the control portion 5 shifts the process to step S20.

Step S15

In step S15, the control portion 5 executes a second detection process of detecting the character area included in the read image read in step S12 and the orientation of the characters included in the character area. Here, the process in step S15 is executed by the area detection portion 54 of the control portion 5.

Step S16

In step S16, the control portion 5 determines whether the character area has been detected in the second detection process executed in step S15.

Here, when the control portion 5 determines that the character area has been detected (Yes in S16), the control portion 5 shifts the process to step S17. When the character area has not been detected (No in S16), the control portion 5 shifts the process to step S19.

Step S17

In step S17, the control portion 5 determines whether the orientation of the characters included in the character area detected in the second detection process coincides with the conveyance direction D1.

Here, when the control portion 5 determines that the orientation of the characters included in the character area coincides with the conveyance direction D1 (Yes in S17), the control portion 5 shifts the process to step S18. When the orientation of the characters included in the character area does not coincide with the conveyance direction D1 (No in S17), the control portion 5 shifts the process to step S19.

Step S18

In step S18, the control portion 5 determines whether the proportion of the character area in the read image read in step S12 is less than the threshold.

Here, when the control portion 5 determines that the proportion of the character area in the read image is less than the threshold (Yes in S18), the control portion 5 shifts the process to step S19. When the proportion of the character area in the read image is not less than the threshold (No in S18), the control portion 5 shifts the process to step S20. Accordingly, execution of a later-described rotation control process including a process of rotating the read image is avoided. Thus, a decrease in the readability of the characters, included in the read image, due to the characters, included in the read image, being turned onto one side or inverted as a result of the read image being rotated, is avoided. In addition, since whether to execute the rotation control process is determined on the basis of the proportion of the character area in the read image, rotation of the read image being limited also in the case where the amount of the characters is small, is avoided.

Step S19

In step S19, the control portion 5 executes the rotation control process described below.

Rotation Control Process

Figure 5:
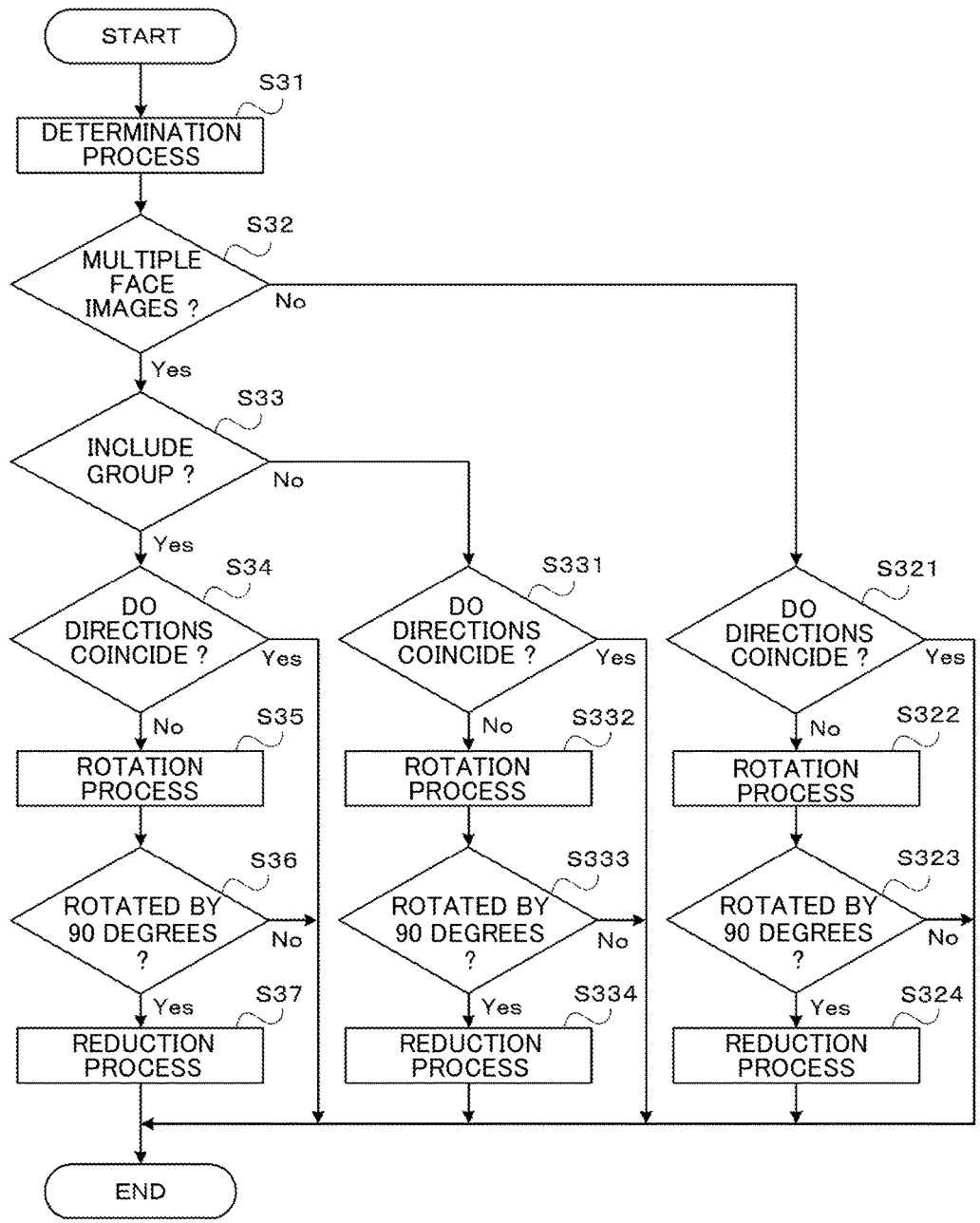
FIG. 5 is a flowchart showing some processes in the face image reading process shown in FIG. 4.

Here, the rotation control process executed in step S19 of the face image reading process will be described with reference to FIG. 5. The description of step S20 and the subsequent step of the face image reading process will be described after end of the description of the rotation control process.

Step S31

First, in step S31, the control portion 5 determines the orientation of each face image included in the read image read in step S12 of the face image reading process. Here, the process in step S31 is an example of a determination step in the present disclosure and is executed by the determination processing portion 53 of the control portion 5.

Step S32

In step S32, the control portion 5 determines whether the read image read in step S12 of the face image reading process includes a plurality of the face images.

Here, when the control portion 5 determines that the read image includes a plurality of the face images (Yes in S32), the control portion 5 shifts the process to step S33. When the read image does not include a plurality of the face images (No in S32), the control portion 5 shifts the process to step S321.

Step S321

In step S321, the control portion 5 determines whether the orientation of the face image determined in step S31 coincides with the conveyance direction D1.

Here, when the control portion 5 determines that the orientation of the face image coincides with the conveyance direction D1 (Yes in S321), the control portion 5 ends the rotation control process. When the orientation of the face image does not coincide with the conveyance direction D1 (No in S321), the control portion 5 shifts the process to step S322.

Step S322

In step S322, the control portion 5 rotates the read image read in step S12 of the face image reading process, to cause the orientation of the face image included in the read image to coincide with the conveyance direction D1.

For example, it is assumed that the read image G10 shown in FIG. 3 does not include the face images G11 to G13 and include only the face image G14. In this case, the control portion 5 rotates the read image G10 by 90 degrees in the clockwise direction to cause the orientation D6 of the face image G14 to coincide with the conveyance direction D1.

Step S323

In step S323, the control portion 5 determines whether the read image has been rotated by 90 degrees in the clockwise direction or in the counterclockwise direction in step S322.

Here, when the control portion 5 determines that the read image has been rotated by 90 degrees (Yes in S323), the control portion 5 shifts the process to step S324. When the read image has not been rotated by 90 degrees (No in S323), the control portion 5 ends the rotation control process.

Step S324

In step S324, the control portion 5 reduces the read image rotated in step S322, to a size in which the read image fits on a sheet to be used for printing in later-described step S21 of the face image reading process.

For example, it is assumed that the size of the read image G10 shown in FIG. 3 and the size of the sheet to be used for printing are each a size of A4 portrait, and the read image G10 has been rotated by 90 degrees in the clockwise direction in step S322. In this case, the control portion 5 reduces the rotated read image G10 at a scaling rate of 70 percent or lower such that the length in a width direction orthogonal to the conveyance direction D1 (the length in the longitudinal direction of the A4 portrait size) of the read image G10 is not greater than the length in the lateral direction of the A4 portrait size. Accordingly, even when the process in step S322 is executed, it is possible to cause the orientations of the face images, included in a plurality of printed matters outputted in later-described step S21 of the face image reading process, to coincide with each other.

Step S33

In step S33, the control portion 5 determines whether the read image read in step S12 of the face image reading process includes the group consisting of a plurality of the face images having similar orientations to each other.

Here, when the control portion 5 determines that the read image includes the group (Yes in S33), the control portion 5 shifts the process to step S34. When the read image does not include the group (No in S33), the control portion 5 shifts the process to step S331.

Step S331

In step S331, the control portion 5 determines whether the orientation of the first face image determined in step S31 coincides with the conveyance direction D1.

Here, when the control portion 5 determines that the orientation of the first face image coincides with the conveyance direction D1 (Yes in S331), the control portion 5 ends the rotation control process. When the orientation of the first face image does not coincide with the conveyance direction D1 (No in S331), the control portion 5 shifts the process to step S332.

Step S332

In step S332, the control portion 5 rotates the read image read in step S12 of the face image reading process, to cause the orientation of the first face image included in the read image to coincide with the conveyance direction D1.

For example, it is assumed that the read image G10 shown in FIG. 3 does not include the face image G14 and includes only the face images G11 to G13. In this case, the control portion 5 rotates the read image G10 by 180 degrees in the clockwise direction to cause the orientation D4 of the face image G12, which is the first face image, to coincide with the conveyance direction D1. Accordingly, it is possible to cause the orientation of the largest face image included in the read image to coincide with the conveyance direction D1.

Step S333

In step S333, similarly to step S323, the control portion 5 determines whether the read image has been rotated by 90 degrees in step S332.

Here, when the control portion 5 determines that the read image has been rotated by 90 degrees (Yes in S333), the control portion 5 shifts the process to step S334. When the read image has not been rotated by 90 degrees (No in S333), the control portion 5 ends the rotation control process.

Step S334

In step S334, similarly to step S324, the control portion 5 reduces the read image rotated in step S332, to a size in which the read image fits on the sheet to be used for printing in later-described step S21 of the face image reading process.

Step S34

In step S34, the control portion 5 determines whether the orientation of each face image that is determined in step S31 and belongs to the specific group coincides with the conveyance direction D1.

Here, when the control portion 5 determines that the orientation of each face image that belongs to the specific group coincides with the conveyance direction D1 (Yes in S34), the control portion 5 ends the rotation control process. When the orientation of each face image that belongs to the specific group does not coincide with the conveyance direction D1 (No in S34), the control portion 5 shifts the process to step S35.

Step S35

In step S35, the control portion 5 rotates the read image read in step S12 of the face image reading process, to cause the orientation of each face image that belongs to the specific group to coincide with the conveyance direction D1. Here, the processes in steps S322, S332, and S35 are examples of a rotation step in the present disclosure and are executed by the rotation processing portion 55 of the control portion 5.

For example, the control portion 5 rotates the read image G10 shown in FIG. 3 by 90 degrees in the clockwise direction to cause the orientation D5 of the face image G13 and the orientation D6 of the face image G14, which belong to the specific group, to coincide with the conveyance direction D1. Accordingly, it is possible to maximize the number of the face images each having an orientation that coincides with the conveyance direction D1, in the read image.

Step S36

In step S36, similarly to step S323, the control portion 5 determines whether the read image has been rotated by 90 degrees in step S35.

Here, when the control portion 5 determines that the read image has been rotated by 90 degrees (Yes in S36), the control portion 5 shifts the process to step S37. When the read image has not been rotated by 90 degrees (No in S36), the control portion 5 ends the rotation control process.

Step S37

In step S37, similarly to step S324, the control portion 5 reduces the read image rotated in step S35, to a size in which the read image fits on the sheet to be used for printing in later-described step S21 of the face image reading process. Here, the processes in steps S324, S334, and S37 are executed by the reduction processing portion 57 of the control portion 5.

In the rotation control process, some or all of the processes in steps S32 to S37, S331 to S334, and S323 to S324 may be omitted.

The description of the rotation control process is ended here, and the description of step S20 and the subsequent step of the face image reading process is restarted.

Step S20

In step S20, the control portion 5 determines whether any document is remaining on the document placement portion 11.

Here, when the control portion 5 determines that any document is remaining on the document placement portion 11 (Yes in S20), the control portion 5 shifts the process to step S11, and executes the processes in steps S11 to S19 until no document remains placed on the document placement portion 11. When no document is remaining on the document placement portion 11 (No in S20), the control portion 5 shifts the process to step S21.

Step S21

In step S21, the control portion 5 prints each read image read in step S12, by using the image forming portion 3. Here, the process in step S21 is executed by the output processing portion 56.

In the face image reading process, a process of reading an image of a document placed on the document table by using the image reading portion 2 may be executed instead of the processes in steps S11 and S12. In this case, the process in step S20 is omitted.

In addition, in the face image reading process, the processes in steps S15 to S18 and S21 may be omitted.

As described above, in the image forming apparatus 10, when the orientation of the face image included in the read image read from the document conveyed by the ADF 1 does not coincide with the conveyance direction D1, the read image is rotated such that the orientation of the face image coincides with the conveyance direction D1. Accordingly, in the read image data, the orientation of the face image, included in the image data, becoming a lateral orientation or a downward orientation is avoided. Therefore, it is possible to omit time and effort to be taken by the user when the image is read from the document including the face image.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a document conveying portion configured to sequentially convey documents placed on a document placement portion;
   an image reading portion configured to read an image of each of the documents conveyed by the document conveying portion; and
   a processor configured to, by calculation processes, function as:
   a detection processing portion configured to detect a face image included in a read image read by the image reading portion;
   a determination processing portion configured to determine an orientation of the face image when the face image is detected by the detection processing portion; and
   a rotation processing portion configured to rotate the read image so as to cause the orientation of the face image determined by the determination processing portion to coincide with a conveyance direction of the documents conveyed by the document conveying portion, when the orientation of the face image does not coincide with the conveyance direction, wherein
   when the read image includes a group consisting of a plurality of the face images having similar orientations to each other, and the orientation of the face images belonging to a specific group including a largest number of the face images does not coincide with the conveyance direction, the rotation processing portion rotates the read image so as to cause the orientation of the face images belonging to the specific group to coincide with the conveyance direction, and
   when a plurality of the specific groups are present and the orientation of the face images belonging to the specific group having a largest total value of the areas of the face images among the plurality of the specific groups does not coincide with the conveyance direction, the rotation processing portion rotates the read image so as to cause the orientation of the face images belonging to the specific group having the largest total value of the areas of the face images to coincide with the conveyance direction.

2. The image reading device according to claim 1, wherein, when the read image includes a plurality of the face images and does not include the group, and an orientation of a first face image that is the largest among the plurality of the face images does not coincide with the conveyance direction, the rotation processing portion rotates the read image so as to cause the orientation of the first face image to coincide with the conveyance direction.

3. The image reading device according to claim 1, wherein, when the read image includes a plurality of the face images and does not include the group, and an orientation of a second face image that is closest from a center of the read image among the plurality of the face images does not coincide with the conveyance direction, the rotation processing portion rotates the read image so as to cause the orientation of the second face image to coincide with the conveyance direction.

4. The image reading device according to claim 1, wherein
   the processor is configured to further function as an area detection portion configured to detect a character area included in the read image and an orientation of characters included in the character area, when the face image is detected by the detection processing portion, and
   when the read image does not include the character area, when the orientation of the characters included in the character area does not coincide with the conveyance direction, or when a proportion of the character area in the read image is less than a predetermined threshold, the rotation processing portion rotates the read image so as to cause the orientation of the face image to coincide with the conveyance direction.

5. The image reading device according to claim 1, wherein
   the processor is configured to further function as an area detection portion configured to detect a character area included in the read image and an orientation of characters included in the character area, when the face image is detected by the detection processing portion, and
   when the read image does not include the character area or when the orientation of the characters included in the character area does not coincide with the conveyance direction, the rotation processing portion rotates the read image so as to cause the orientation of the face image to coincide with the conveyance direction.

6. The image reading device according to claim 1, wherein the rotation processing portion: determines that the orientation of the face image coincides with the conveyance direction, when an angle formed between the orientation of the face image and the conveyance direction is not less than 0 degree and not greater than 45 degrees; rotates the read image by 90 degrees in a direction in which the angle is decreased, when the angle exceeds 45 degrees and is not greater than 135 degrees; and rotates the read image by 180 degrees when the angle exceeds 135 degrees and is not greater than 180 degrees.

7. An image forming apparatus comprising:
the image reading device according to claim 1; and
an image forming portion configured to form an image on the basis of image data.

8. The image forming apparatus according to claim 7, wherein
when an angle formed between the orientation of the face image and the conveyance direction exceeds 45 degrees and is not greater than 135 degrees, the rotation processing portion rotates the read image by 90 degrees in a direction in which the angle is decreased, and
the processor is configured to further function as:
a print processing portion configured to print each read image by using the image forming portion; and
a reduction processing portion configured to reduce the rotated read image to a size in which the read image fits on a sheet to be used for printing by the print processing portion, when the read image is rotated by 90 degrees by the rotation processing portion.

9. An image reading method executed in an image reading device that includes: a document conveying portion configured to sequentially convey documents placed on a document placement portion, an image reading portion configured to read an image of each of the documents conveyed by the document conveying portion, and a processor configured to execute the method, the method comprising:

a detection step of detecting a face image included in a read image read by the image reading portion;

a determination step of determining an orientation of the face image when the face image is detected in the detection step; and a rotation step of rotating the read image so as to cause the orientation of the face image determined in the determination step to coincide with a conveyance direction of the documents conveyed by the document conveying portion, when the orientation of the face image does not coincide with the conveyance direction, wherein in the rotation step, when the read image includes a group consisting of a plurality of the face images having similar orientations to each other, and the orientation of the face images belonging to a specific group including the largest number of the face images does not coincide with the conveyance direction, the read image is rotated so as to cause the orientation of the face images belonging to the specific group to coincide with the conveyance direction, and in the rotation step, when a plurality of the specific groups are present and the orientation of the face images belonging to the specific group having the largest total value of the areas of the face images among the plurality of the specific groups does not coincide with the conveyance direction, the read image is rotated so as to cause the orientation of the face images belonging to the specific group having the largest total value of the areas of the face images to coincide with the conveyance direction.

* * * * *